(12) United States Patent
Yamamoto

(10) Patent No.: US 8,422,980 B2
(45) Date of Patent: Apr. 16, 2013

(54) HIGH-FREQUENCY CIRCUIT IN WHICH HIGH-FREQUENCY FILTER IS PARALLEL INSTALLED TO INTEGRATED CIRCUIT

(75) Inventor: Masaki Yamamoto, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 1552 days.

(21) Appl. No.: 11/940,992

(22) Filed: Nov. 15, 2007

(65) Prior Publication Data

US 2008/0136558 A1   Jun. 12, 2008

(30) Foreign Application Priority Data

Dec. 11, 2006 (JP) .................................. 2006-333048

(51) Int. Cl.
*H03D 7/1433* (2006.01)

(52) U.S. Cl.
USPC ........ 455/333; 455/188.1; 455/307; 455/334; 455/338; 455/339; 333/33; 348/731

(58) Field of Classification Search ............... 455/188.1, 455/333, 307, 334, 338, 339; 333/33; 348/731, 348/725
See application file for complete search history.

(56) References Cited

U.S. PATENT DOCUMENTS

| | | | | |
|---|---|---|---|---|
| 5,777,529 | A | * | 7/1998 | Lowe ............................... 333/33 |
| 2003/0133047 | A1 | * | 7/2003 | Yamamoto ..................... 348/725 |
| 2003/0202126 | A1 | * | 10/2003 | Sasaki ............................ 348/731 |
| 2005/0040896 | A1 | | 2/2005 | Yahagi et al. |
| 2005/0101282 | A1 | | 5/2005 | Takikawa et al. |
| 2005/0201175 | A1 | | 9/2005 | Fenk |

FOREIGN PATENT DOCUMENTS

| | | | |
|---|---|---|---|
| EP | 1 005 155 | | 5/2000 |
| EP | 1 328 064 | | 7/2003 |
| JP | 03076148 A | * | 4/1991 |
| JP | 11-69245 | | 3/1999 |
| JP | 2003-318754 | | 11/2003 |

OTHER PUBLICATIONS

European Search Report dated Apr. 1, 2008 from corresponding European Application No. 07023360.

* cited by examiner

*Primary Examiner* — Junpeng Chen
(74) *Attorney, Agent, or Firm* — Beyer Law Group LLP

(57) ABSTRACT

The present invention provides a high-frequency circuit capable of acquiring the original transmission characteristics of a filter by preventing capacitive coupling between input and output terminals of the filter externally attached to the integrated circuit and effectively using a mounting space. The high-frequency circuit includes a rectangular integrated circuit 10 having two long sides 10a and 10b and two short sides 10c and 10d and a SAW filter 15, disposed to be adjacent to the short side 10d of the integrated circuit 10, having input terminals 24a and 24b disposed on the long side 10a side and output terminals 28a and 28b disposed on the other long side 10b side. IC output terminals 22a and 22b connected to input terminals 24a and 24b of the SAW filter 15 are disposed on a position of one long side 10a of the integrated circuit 10 on the SAW filter 15 side, and IC input terminals 26a and 26b connected to output terminals 28a and 28b of the SAW filter 15 are disposed on a position of the other long side 10b of the integrated circuit 10 on the SAW filter 15 side.

18 Claims, 2 Drawing Sheets

HIGH-FREQUENCY CIRCUIT IN WHICH HIGH-FREQUENCY FILTER IS PARALLEL INSTALLED TO INTEGRATED CIRCUIT

BACKGROUND OF THE INVENTION

1. Field of the Invention

The present invention relates to a high-frequency circuit in which a high-frequency filter is parallel installed to an integrated circuit.

2. Description of the Related Art

Conventionally, a television tuner that has a mixer for converting an UHF band television signal or a VHF band television signal into an intermediate band television signal by converting the frequency of the UHF or VHF band television signal, an intermediate frequency band amplifier for amplifying the intermediate frequency band television signal, and a SAW filter, which includes a trap circuit for attenuating video and audio intermediate frequency signals of a channel adjacent to the intermediate frequency band, interposed between the mixer and the intermediate frequency amplifier has been proposed (for example, see JP-A-H11-69245 or JP-A-2003-318754).

FIG. 2 is a diagram illustrating the configuration of a television tuner described in JP-A-11-69245. A television signal of a specific channel in the UHF or VHF band selected by a tuning circuit or the like, which is not shown in the figure, is input to a mixer 101 through an input terminal 101a, and a local oscillator signal is input to the mixer 101 from a local oscillator 102. In the mixer 101, the input UHF or VHF band television signal is mixed with the local oscillator signal, and thereby being converted into an intermediate frequency band television signal. Here, the intermediate frequency band television signal will be abbreviated as an intermediate frequency signal. The intermediate frequency signal output from the mixer 101 is input to an intermediate frequency amplifier 104 through a SAW (surface acoustic wave) filter 103 that is an intermediate frequency band pass filter. The intermediate frequency signal input to the intermediate frequency amplifier 104 is amplified and is detected by a video detector 105 having a synchronization detecting circuit, and a video signal V is output from the video detector 105.

As shown in FIG. 3, the mixer 101, the intermediate frequency amplifier 104, and the video detector 105 are configured as one integrated circuit 108. In this integrated circuit 108, output terminals 101b and 101c of the mixer 101 and input terminals 104a and 104b of the intermediate frequency amplifier 104 are disposed. Input terminals 103a and 103b of the SAW filter 103 are connected to the output terminals 101b and 101c of the mixer 101 through a capacitor 106. In addition, output terminals 103c and 103d of the SAW filter 103 are connected to the input terminals 104a and 104b of the intermediate frequency amplifier 104 through a capacitor 107.

By using the above-described configuration, the SAW filter 103 is connectable in a simple manner and the intermediate frequency amplifier 104 and the video detector 105 can be directly connected together, and thereby the configuration of the integrated circuit 108 becomes simple.

However, in the conventional television tuner, since the output terminals 101b and 101c of the SAW filter 103 and the input terminals 104a and 104b thereof are disposed to be adjacent to each other on one side of the integrated circuit 108, the input and output sides of the SAW filter 103 are capacitively coupled, and thereby there is a problem that the original characteristics of the SAW filter 103 cannot be acquired.

In addition, since terminal pitches (for example 1.78 mm to 2.5 mm) of the SAW filter 103 are much larger than terminal pitches (for example, 0.5 mm to 0.65 mm) of the output terminals 101b and 101c and the input terminals 104a and 104b which are disposed on one side of the integrated circuit 108, there is a problem that it is difficult to effectively use a mounting space for disposition of the SAW filter 103 and the peripheral components.

SUMMARY OF THE INVENTION

The present invention is designed to solve the above-described problems, and an object of the invention is to provide a high-frequency circuit capable of acquiring the original transmission characteristics of a filter by preventing capacitive coupling between input and output terminals of the filter externally attached to the integrated circuit and effectively using a mounting space.

A high-frequency circuit according to an aspect of the present invention includes a rectangular integrated circuit having first and second sides which face with each other and third and fourth sides which face with each other, a high-frequency filter disposed to be adjacent to the third side which is one side of the integrated circuit and is interposed between the first and second sides and having an input terminal disposed on a first side and an output terminal disposed on a second side, a first terminal, which is connected to the input terminal of the high-frequency filter, disposed in a position of the first side of the integrated circuit on a high-frequency filter side, and a second terminal, which is connected to the output terminal of the high-frequency filter, disposed in a position of the second side of the integrated circuit on a high-frequency filter side.

According to the above-mentioned configuration, while the first and second sides of the integrated circuit face each other, the first terminal is disposed on the first terminal of the integrated circuit forming a rectangular shape and the second terminal is disposed on the second side of the integrated circuit, and thus, a capacitive coupling circuit is not formed between the first and second terminals used as input and output terminals of the integrated circuit, and thereby it is possible to prevent deterioration of transmission characteristics of the high-frequency filter due to capacitive coupling of the input and output terminals of the high frequency filter. In addition, since a gap between the first and second terminals which is at least the same degree as that of the third side is acquired, terminal pitches can be formed to be appropriate for the scale of the high frequency filter, compared to a structure in which the input and output terminals of the integration circuit are disposed adjacently, and thereby it is possible to use the mounting space effectively.

In the high-frequency filter, the high-frequency filter may be a SAW filter. In addition, it is preferable that peripheral terminals adjacent to the first and second terminals are in a low impedance state.

In the high-frequency circuit, it may be configured that a television signal is converted into an intermediate frequency signal by the integrated circuit, the intermediate frequency signal is input to the high-frequency filter through the first terminal, an unnecessary frequency component is removed from the intermediate frequency signal by the high-frequency filter, the intermediate frequency signal from which the unnecessary frequency component has been removed is input to the integrated circuit through the second terminal again, and an output signal optimized for digital television signal processing is acquired.

According to the present invention, the original transmission characteristics of a filter by preventing capacitive coupling between input and output terminals of the filter externally attached to the integrated circuit can be acquired and the mounting space can be effectively used.

DESCRIPTION OF THE PREFERRED EMBODIMENT

Hereinafter, an embodiment of the present invention will be described in detail with reference to the accompanying drawings.

Figure 1:
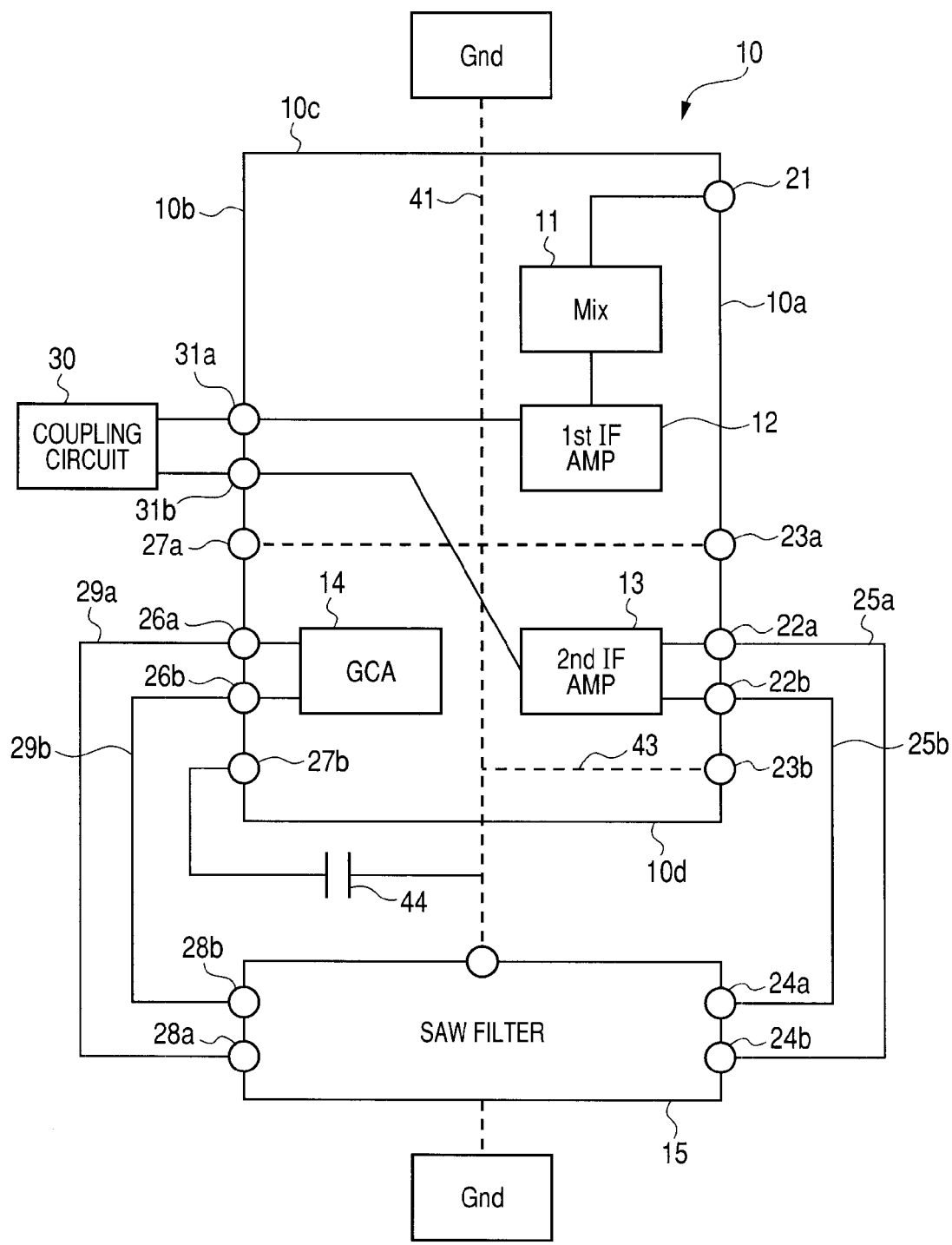
FIG. 1 is a diagram illustrating the configuration of an integrated circuit of a television tuner according to an embodiment of the present invention and peripheral circuits thereof.
Figure 2:
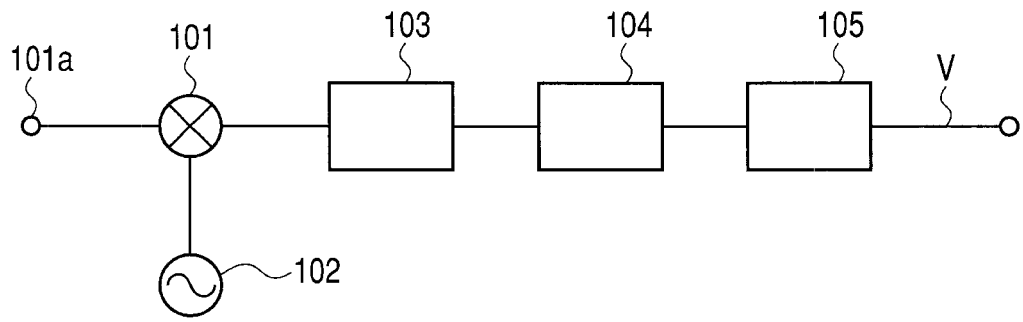
FIG. 2 is a block diagram of a conventional television tuner.
Figure 3:
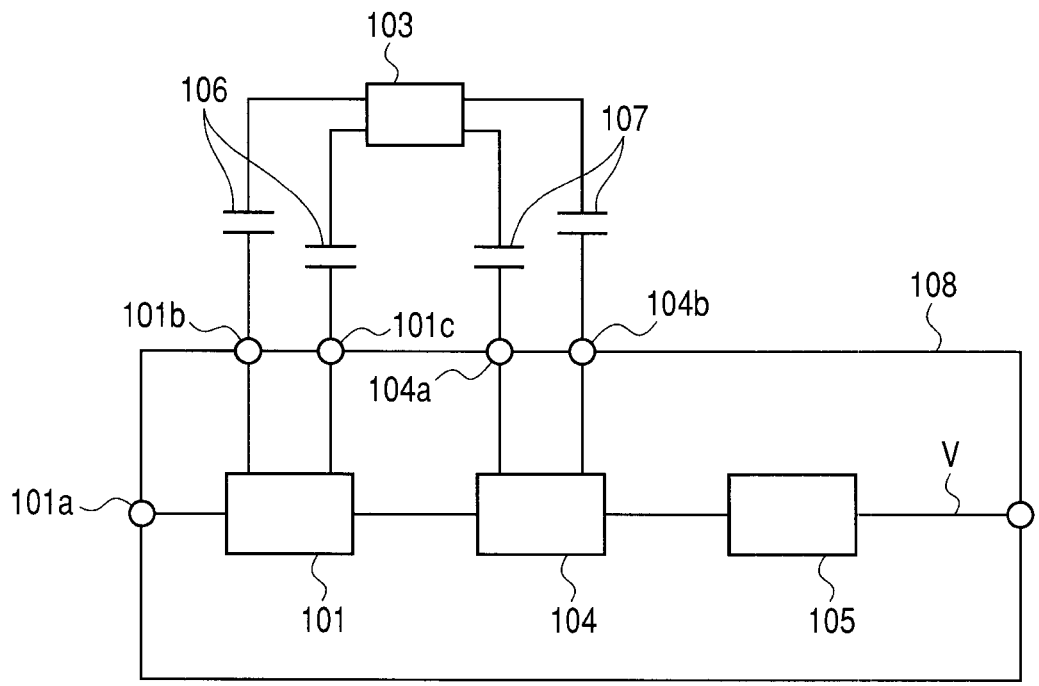
FIG. 3 is a diagram illustrating the configuration of an integrated circuit of the television tuner shown in FIG. 2 and peripheral circuits thereof.

FIG. 1 is a diagram illustrating disposition of an integrated circuit of a television tuner according to an embodiment of the present invention and peripheral circuits thereof. Since the whole configuration of the television tuner is basically the same as shown in FIG. 2, a description thereof is omitted, here.

The integrated circuit 10 is disposed on a circuit substrate of the television tuner which is not shown in the figure. This integrated circuit 10 is in the shape of a rectangular and has a pair of left and right long sides 10a and 10b and a pair of upper and lower short sides 10c and 10d. In this embodiment, the pair of long sides 10a and 10b correspond to the first and second sides, and the pair of short sides 10c and 10d correspond to the fourth and third sides. When the integrated circuit 10 has a square shape, there is no difference between the long sides and the short sides. Inside the integrated circuit 10, a mixer 11, a first intermediate frequency amplifier 12, a second intermediate frequency amplifier 13, a variable gain amplifier 14, and other circuit components used for acquiring a video signal are installed.

On a circuit substrate on which the integrated circuit 10 is built, a SAW filter 15 is disposed in a position facing the short side 10d of the integrated circuit 10 and close to the short side 10d On one long side 10a of the integrated circuit 10, an RF input terminal 21 to which an RF signal supplied from an antenna side is applied and IC output terminals 22a and 22b used as the first terminals for outputting a balanced output of the second intermediate frequency amplifier 13 outside the integrated circuit are disposed. In addition, ground terminals 23a and 23b are disposed to interpose the IC output terminals 22a and 22b therebetween. The IC output terminals 22a and 22b are connected to input terminals 24a and 24b of the SAW filter 15 through wiring patterns 25a and 25b.

On one other long side 10b of the integrated circuit 10, IC input terminals 26a and 26b used as second terminals for inputting an output signal of the SAW filter 15 to the inside of the integrated circuit are disposed to have a predetermined terminal pitch. In addition, ground terminals 27a and 27b are disposed to interpose the IC input terminals 26a and 26b therebetween. Output terminals 28a and 28b of the SAW filter 15 are connected to the IC input terminals 26a and 26b through wiring patterns 29a and 29b.

A coupling circuit 30 is disposed in a position facing the other long side 10b of the integrated circuit 10 and close to the other long side. In addition, an output terminal 31a for outputting an unbalanced output of the first intermediate frequency amplifier 12 outside the integrated circuit and an input terminal 31b for inputting an unbalanced output of the coupling circuit 30 to the integrated circuit are provided.

As shown in FIG. 1, inside the integrated circuit 10, the mixer 11, the first intermediate frequency amplifier 12, and the second intermediate frequency amplifier 13 are disposed on the one long side 10a side, and the variable gain amplifier 14 is disposed on the other long side 10b side. In addition, on a rear side of the integrated circuit 10, a ground pattern 41 is formed so as to separate the one long side 10a side and the other long side 10b side from the center of the integrated circuit. This ground pattern 41 extends to the SAW filter 15 and separates the input terminals 24a and 24b disposed on one short side (a side on the same side as the one long side 10a) of the SAW filter 15 and the output terminals 28a and 28b disposed on the other short side (a side on the same side as the other long side 10b) from the center of the SAW filter 15.

In addition, a ground pattern 42 connecting the ground terminal 23a disposed on the one long side 10a side to the ground terminal 27a disposed on the other long side 10b side is formed horizontally. In addition, a ground pattern 43 connecting the ground terminal 23b disposed on the one long side 10a side to a center ground pattern 41 is formed horizontally. The ground terminal 27b adjacent to the IC input terminal 26b disposed on the other long side 10b side is grounded for high frequencies by being connected to the ground pattern 41 through a capacitor 44.

The operation of the above-described embodiment will now be described.

A television signal of a specific channel is input to the inside of the integrated circuit 10 from the RF input terminal 21 and is mixed with a local oscillator signal by the mixer 11, and thereby being frequency-converted into an intermediate frequency signal. Then, the intermediate frequency signal output from the mixer 101 is amplified by the first intermediate frequency amplifier 12 and is output from the output terminal 31a to the coupling circuit 30 as an unbalanced output. Then, a frequency component of a lower adjacent channel of a selected channel for reception is removed from the amplified intermediate frequency signal by the coupling circuit 30, and then the intermediate frequency signal is input to the input terminal 31b of the integrated circuit 10 again as an unbalanced input. The intermediate frequency signal applied to the input terminal 31b of the integrated circuit 10 is input to the second intermediate frequency amplifier 13. Then, the intermediate frequency signal amplified by the second intermediate frequency amplifier 13 is output from the IC output terminals 22a and 22b to the SAW filter 15 other than the integrated circuit 10, as a balanced output. Then, a digital television signal component is extracted from the intermediate frequency signal by the SAW filter 15. An intermediate frequency signal having the digital television signal component extracted by the SAW filter 15 is output from the output terminals 28a and 28b and is applied to the IC input terminals 26a and 26b of the integrated circuit 10. The gain of the intermediate frequency signal applied to the IC input terminals 26a and 26b of the integrated circuit 10 is adjusted by the variable gain amplifier 14, and the intermediate frequency signal having the adjusted gain is supplied to a digital television detecting circuit not shown in the figure and is demodulated.

In this embodiment, while the IC output terminals 22a and 22b of the integrated circuit 10 connected to the input terminals 24a and 24b of the SAW filter 15 are disposed on one long side 10a of the integrated circuit 10, and the IC input terminals 26a and 26b of the integrated circuit 10 connected to the output terminals 28a and 28b of the SAW filter 15 are disposed on the other long side 10b of the integrated circuit 10. Thus, the IC output terminals 22a and 22b of the integrated circuit 10 and the IC input terminals 26a and 26b of the integrated circuit 10 are disposed on the long sides 10a and 10b located separately on opposite sides. Accordingly, the problem that the IC output terminals 22a and 22b of the integrated circuit 10 and the IC input terminals 26a and 26b thereof are capacitively coupled can be solved, and thereby deterioration of the transmission characteristics of the SAW filter 15 due to formation of a capacitive coupling circuit between the input terminals 24a and 24b of the SAW filter 15 and the output terminals 28a and 28b thereof can be prevented.

In addition, by disposing the IC output terminals 22a and 22b of the integration circuit 10 and the IC input terminals 26a and 26b of the integration circuit 10 on the long sides 10a and 10b located separately on opposite sides, terminal pin pitches of the input and output terminals of the integrated circuit side can be formed in a size appropriate for the scale of the SAW filter 15, and thereby it is possible to use the mounting space effectively.

In this embodiment, the ground pattern 41 is disposed between the IC output terminals 22a and 22b and the IC input terminals 26a and 26b, terminals (the ground terminals 23a and 23b) adjacent to the IC output terminals 22a and 22b are grounded, and a terminal (the ground terminal 27a) adjacent to the input terminal 26a is grounded, and a terminal (the ground terminal 27b) adjacent to the input terminal 26b is grounded for high frequencies. Accordingly, the terminals adjacent to the IC output terminals 22a and 22b and the IC input terminals 26a and 26b can be in a low impedance state, and thereby it is possible to prevent interferences between circuits.

In the descriptions above, although the SAW filter 15 has been described as a filter connected between the IC output terminals 22a and 22b of the integrated circuit 10 and the IC input terminals 26a and 26b of the integrated circuit 10, as an example, any type of filter may be used. In addition, the present invention is not limited to an integrated circuit of a television tuner and may be applied to a high-frequency circuit in which a high frequency filter having desired characteristics is connected to an integrated circuit similarly.

The present invention can be applied to a television tuner in which a high-frequency filter is parallel installed to an integrated circuit.

The invention claimed is:

1. A high-frequency circuit comprising:
  a rectangular integrated circuit having first and second sides which face with each other and third and fourth sides which face with each other; and
  a high-frequency filter disposed adjacent to the third side of the integrated circuit, the high-frequency filter having:
    an input terminal disposed on a side located on a same side as the first side; and
    an output terminal disposed on another side located on a same side as the second side,
  wherein the rectangular integrated circuit comprises:
    a first terminal configured to output a high-frequency signal, the first terminal being provided on the first side and connected to the input terminal of the high-frequency filter; and
    a second terminal configured to receive a filtered high-frequency signal, the second terminal being provided on the second side and connected to the output terminal of the high-frequency filter,
  and wherein the high-frequency circuit further comprises:
    a ground pattern provided between the first side and the second side along a center line of the integrated circuit, the ground pattern extending to the high-frequency filter between the input terminal and the output terminal along a center line of the high-frequency filter.

2. The high-frequency circuit according to claim 1, wherein the high-frequency filter is a SAW filter.

3. The high-frequency circuit according to claim 1, wherein the rectangular integrated circuit further comprises:
  a pair of ground terminals provided on both sides of and adjacent to the first and second terminals.

4. The high-frequency circuit according to claim 1, wherein a television signal is converted into an intermediate frequency signal by the integrated circuit, the intermediate frequency signal is input to the high-frequency filter through the first terminal, an unnecessary frequency component is removed from the intermediate frequency signal by the high-frequency filter, the intermediate frequency signal from which the unnecessary frequency component has been removed is input to the integrated circuit through the second terminal again, and an output signal optimized for digital television signal processing is acquired.

5. The high-frequency circuit according to claim 1, wherein the first terminal is positioned on the first side closer to the third side than to the forth side, and the second terminal is positioned on the second side closer to the third side than to the forth side.

6. The high-frequency circuit according to claim 1, wherein the integrated circuit comprises:
  an input terminal configured to receive an RF input signal to be processed in the high-frequency circuit; and
  an output terminal configured to output an output signal processed through the high-frequency circuit.

7. The high-frequency circuit according to claim 3, wherein one of the ground terminals adjacent to the second terminal is grounded through a high-frequency coupling.

8. The high-frequency circuit according to claim 1, wherein:
  the integrated circuit is configured to receive and convert a television signal into an intermediate high-frequency signal and output the intermediate high-frequency signal from the first terminal;
  the high-frequency filter is configured to receive and filter the intermediate high-frequency signal so as to remove an undesirable frequency component from the intermediate high-frequency signal, and output a filtered intermediate high-frequency signal; and
  the integrated circuit is further configured to receive the filtered intermediate high-frequency signal at the second terminal, and obtain an output signal optimized for digital television signal processing.

9. The high-frequency circuit according to claim 1, wherein a capacitive coupling between the input terminal and the output terminal of the high-frequency filter is prevented by providing the first terminal on the first side and the second terminal on the second side opposite to the first side.

10. The high-frequency circuit according to claim 1, wherein the rectangular integrated circuit has no terminal on the third side which is connected to the input terminal or the output terminal of the high-frequency filter.

11. The high-frequency circuit according to claim 1, wherein the input terminal of the high-frequency filter is coupled only to the first terminal on the first side, and the output terminal of the high-frequency filter is coupled only to the second terminal on the second side.

12. A high-frequency circuit comprising:
   a rectangular integrated circuit configured to receive and process an RF input signal and output a processed signal, the integrated circuit including:
      a first side;
      a second side opposite to the first side;
      a third side;
      a forth side opposite to the third side;
      a first terminal configured to output a high-frequency signal, the first terminal being provided on the first side; and
      a second terminal configured to receive a filtered high-frequency signal, the second terminal being provided on the second side;
   a high-frequency filter configured to filter the high-frequency signal to remove an undesired component therefrom and output the filtered high-frequency signal, the high-frequency filter being provided adjacent to the third side of the integrated circuit and including:
      an input terminal configured to receive the high-frequency signal, the input terminal being connected to the first terminal on the first side; and
      an output terminal configured to output the filtered high-frequency signal, the output terminal being connected to the second terminal on the second side; and
   a ground pattern provided between the first side and the second side along a center line of the integrated circuit, the ground pattern extending to the high-frequency filter between the input terminal and the output terminal along a center line of the high-frequency filter.

13. The high-frequency circuit according to claim 12, wherein the first terminal is positioned on the first side closer to the third side than to the forth side, and the second terminal is positioned on the second side closer to the third side than to the forth side.

14. The high-frequency circuit according to claim 12, wherein the rectangular integrated circuit further comprises:
   a pair of ground terminals provided on both sides of and adjacent to the first and second terminals.

15. The high-frequency circuit according to claim 14, wherein one of the ground terminals adjacent to the second terminal is grounded through a high-frequency coupling.

16. The high-frequency circuit according to claim 12, wherein a capacitive coupling between the input terminal and the output terminal of the high-frequency filter is prevented by providing the first terminal on the first side and the second terminal on the second side opposite to the first side.

17. The high-frequency circuit according to claim 12, wherein the rectangular integrated circuit has no terminal on the third side which is connected to the input terminal or the output terminal of the high-frequency filter.

18. The high-frequency circuit according to claim 12, wherein the input terminal of the high-frequency filter is coupled only to the first terminal on the first side, and the output terminal of the high-frequency filter is coupled only to the second terminal on the second side.

* * * * *